(12) United States Patent
Hussey et al.

(10) Patent No.: US 8,127,992 B2
(45) Date of Patent: *Mar. 6, 2012

(54) OPTICAL READING DEVICE WITH PROGRAMMABLE LED CONTROL

(75) Inventors: Robert M. Hussey, Camillus, NY (US); Charles P. Barber, Fayetteville, NY (US); Brian L. Jovanovski, Syracuse, NY (US); David M. Holzhauer, Camillus, NY (US); Edward C. Bremer, Victor, NY (US); Matthew W. Pankow, Camillus, NY (US); Stephen P. Deloge, Palmyra, NY (US); Timothy P. Meier, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 571 days.

This patent is subject to a terminal disclaimer.

(21) Appl. No.: 12/167,080

(22) Filed: Jul. 2, 2008

(65) Prior Publication Data

US 2011/0101102 A1    May 5, 2011

Related U.S. Application Data

(63) Continuation of application No. 11/405,964, filed on Apr. 18, 2006, now abandoned, which is a continuation-in-part of application No. 10/842,851, filed on May 11, 2004, now Pat. No. 7,637,430.

(60) Provisional application No. 60/470,016, filed on May 12, 2003.

(51) Int. Cl.
G06K 7/10 (2006.01)
G06K 7/14 (2006.01)

(52) U.S. Cl. .................................. 235/454; 235/462.18

(58) Field of Classification Search .................. 235/454, 235/462.21, 462.22
See application file for complete search history.

(56) References Cited

U.S. PATENT DOCUMENTS 6,340,114 B1 * 1/2002 Correa et al. ............ 235/462.22
7,637,430 B2 * 12/2009 Hawley et al. ................ 235/454

* cited by examiner

*Primary Examiner* — Daniel Hess
(74) *Attorney, Agent, or Firm* — Hiscock & Barclay, LLP

(57) ABSTRACT

An apparatus comprising: a sensor array having rows of pixels which are exposed to symbol indicia, wherein the sensor array generates a sync signal; an aiming pattern generator for producing an aiming pattern superimposed on the symbol indicia; a processor which utilizes the sync signal to control the aiming pattern generator to: turn on the aiming pattern during exposure of a first predetermined row of pixels; turn off the aiming pattern during exposure of a second predetermined row of pixels; turn on the aiming pattern during exposure of a third predetermined row of pixels; and, a housing for housing the sensor array, aiming pattern generator and processor for hand held operation.

18 Claims, 16 Drawing Sheets

OPTICAL READING DEVICE WITH PROGRAMMABLE LED CONTROL

CROSS-REFERENCE TO RELATED APPLICATIONS

This application is a continuation of and claims priority of copending U.S. patent application Ser. No. 11/405,964 filed Apr. 18, 2007, entitled "Optical Reading Device with Programmable LED Control." The priority of the above application is claimed, and the disclosure of the above application is incorporated herein by reference in its entirety.

This application is a continuation-in-part of and claims priority of co-pending U.S. patent application Ser. No. 10/842,851 filed May 11, 2004, entitled "Picture Taking Optical Reader." The priority of the above application is claimed, and the disclosure of the above application is incorporated herein by reference in its entirety, which application claims priority of Provisional Application No. 60/470,016 filed May 12, 2003, entitled "Picture Taking Optical Reader." The priority of the above application is claimed, and the disclosure of the above application is incorporated herein by reference in its entirety.

FIELD OF THE INVENTION

The present invention relates to optical reading devices, and more particularly to an optical reading device having programmable aimer and/or illumination control.

BACKGROUND

Optical reading devices typically read data represented by symbols. For instance a bar code symbol is an array of rectangular bars and spaces that are arranged in a specific way to represent elements of data in machine readable form. Optical reading devices typically transmit light onto a symbol and receive light reflected off of the symbol. The received light is interpreted by an image processor to extract the data represented by the symbol.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively high resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures. When scanning 2D matrix codes, the horizontal and vertical relationships of data elements are recorded with about equal resolution.

Often times a bar code reader may be portable and wireless in nature thereby providing added flexibility. In these circumstances, such portable bar code readers form part of a wireless network in which data collected within the terminals is communicated to a host computer situated on a hardwired backbone via a wireless link. For example, the portable bar code readers may include a radio or optical transceiver for communicating with a host computer via a base station.

Conventionally, a bar code reader, whether portable or otherwise, includes a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

BRIEF DESCRIPTION OF THE DRAWINGS

FIG. 8b is a timing diagram used in the rolling shutter architecture presented with respect to FIG. 8a.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts.

An optical reader in accordance with the invention may be adapted for reading symbol indicia for numerous functions. A detailed description of transaction terminals and their operation is disclosed in commonly owned published United States Patent Application Publication No. 20030029917 entitled OPTICAL READER FOR IMAGING MODULE, which is hereby incorporated herein in it's entirety.

The description of the optical reader in said publication is broken down into the eight subheadings: General Imaging Module Architectures and Assembly; Illumination Systems; Aiming Systems, Illumination Device Architectures; Illumination/Aiming Color Emission Control and Coordination; Receive Optics, Packaging of Electronics; and Applications, Operating Environment, and Control Circuit Functionality.

Block diagrams of electrical circuit control configurations which may be wholly or partially incorporated in reader 10 or used in combination with circuitry of reader 10 are now described.

Figure 1:
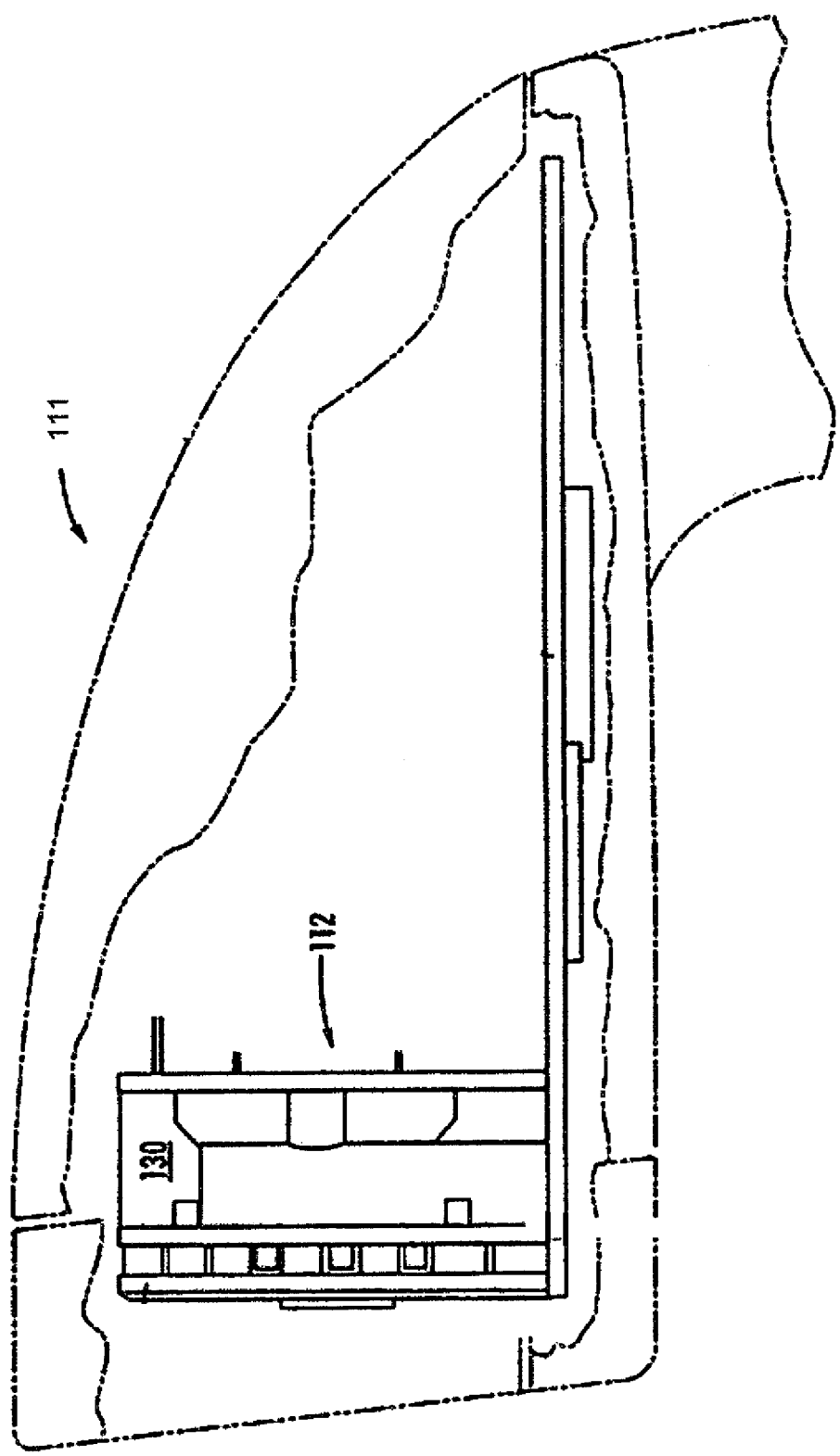
FIG. 1 is a fragmentary partially cutaway side view of a reader which has an optics unit and an aiming pattern generator in accordance with the invention.
Figure 2:
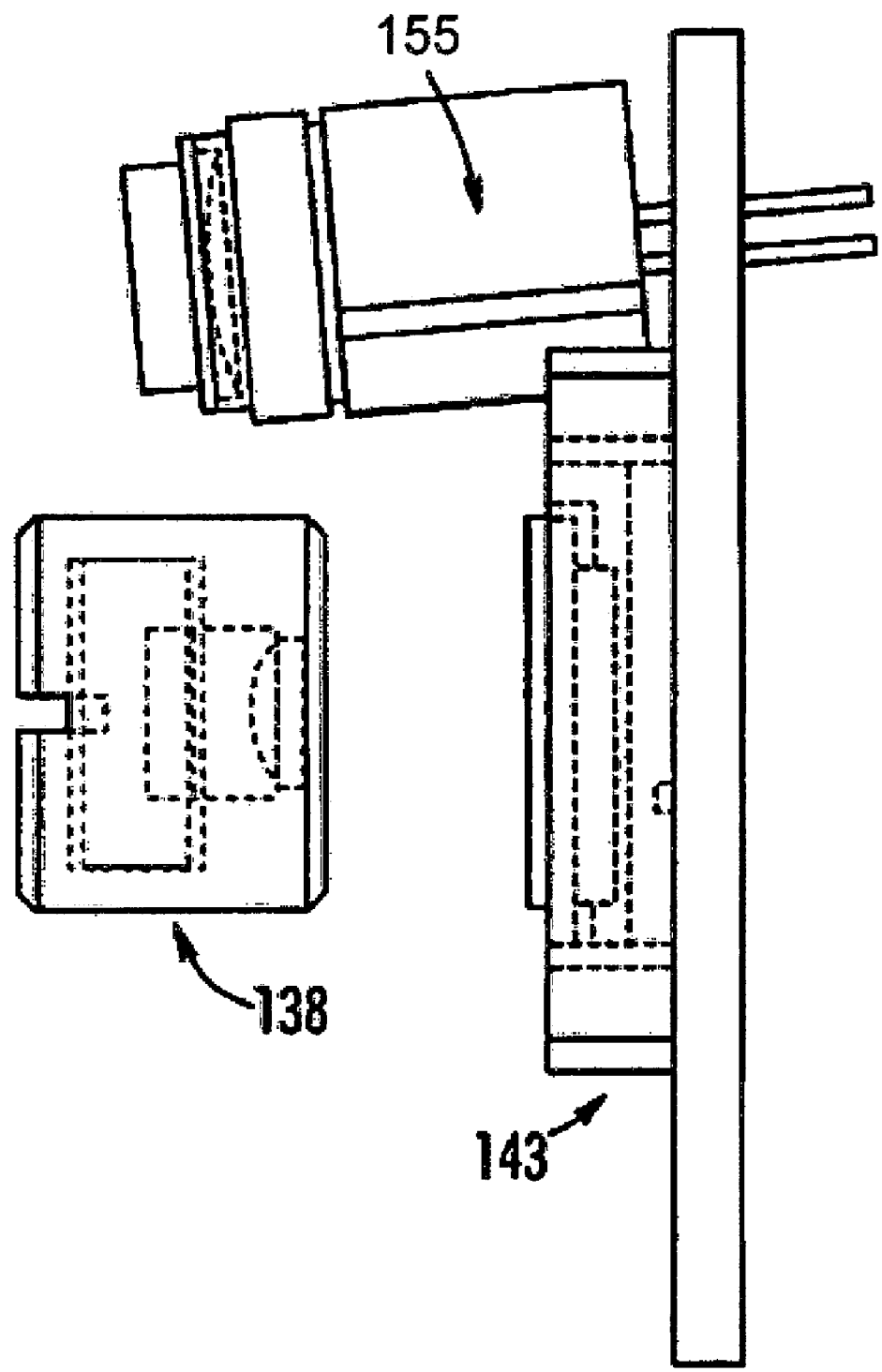
FIG. 2 is a side view of an optics assembly in accordance with the invention.

Referring to FIGS. 1 and 2, there is shown an enlarged fragmentary cross-sectional view of an optical reader 111 constructed in accordance the invention. Reader 111 includes a low profile imaging assembly 112 which includes a 2D imager or imaging subassembly 143, a lens or imaging optics subassembly 138 and an aiming pattern generator or subassembly 155. The latter subassemblies are obscured in FIG. 1 by a single piece or monolithic mounting/retaining structure 130 which supports, separates and encloses the same. This mounting structure is provided with holes through which may be passed the screws (not shown) which hold optics unit 112 together as a complete compact scanning assembly or engine.

Aiming illumination pattern generator 155 is adapted to generate a 2D aiming pattern which is defined, and aligned or coincident with the field of view of imaging subassembly 143. A number of representative 2D aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

To this end, the patterns may be generated by an aiming pattern generator 155 which takes the form of a module or cartridge one embodiment of which is shown in assembled, cross-sectional form in FIG. 2. Aiming generator 155 may include a point-like light source, such as a laser diode or resonant cavity LED, an aiming optics assembly, and interference pattern generating device which are together adapted to fit into an appropriately shaped receiving cavity defined by a mounting member.

The light source of aiming generator 155 may comprise a surface emitting visible laser diode such as those available from Rohm, or a non-laser light source such as a light emitting diode (LED). More generally, the light source may comprise any light source which is sufficiently small to approximate a thin source and sufficiently bright to provide the desired intensity illumination at the target. Coherency of the light is not essential for purposes of the present invention.

To the end, a collimated light beam may be used to generate an aiming pattern of the desired type and shape, aiming pattern generator 155 may include an interference pattern generating element, such as a holographic element, diffractive optic element that includes one or more diffractive gratings, or a Fresnel type optic element which has been fabricated with the desired pattern in mind. Examples of each of these types of elements are known, commercially available items and may be purchased, for example, from Digital Optics Corp. of Charlotte, N.C. among others. Elements of some of these types and methods for making them are also described in U.S. Pat. Nos. 4,895,790 (Swanson); 5,170,269 (Lin et al) and 5,202,775 (Feldman et al), which are hereby incorporated herein by reference. Accordingly, the structure and operation of these devices will be described only generally herein.

Figure 3:
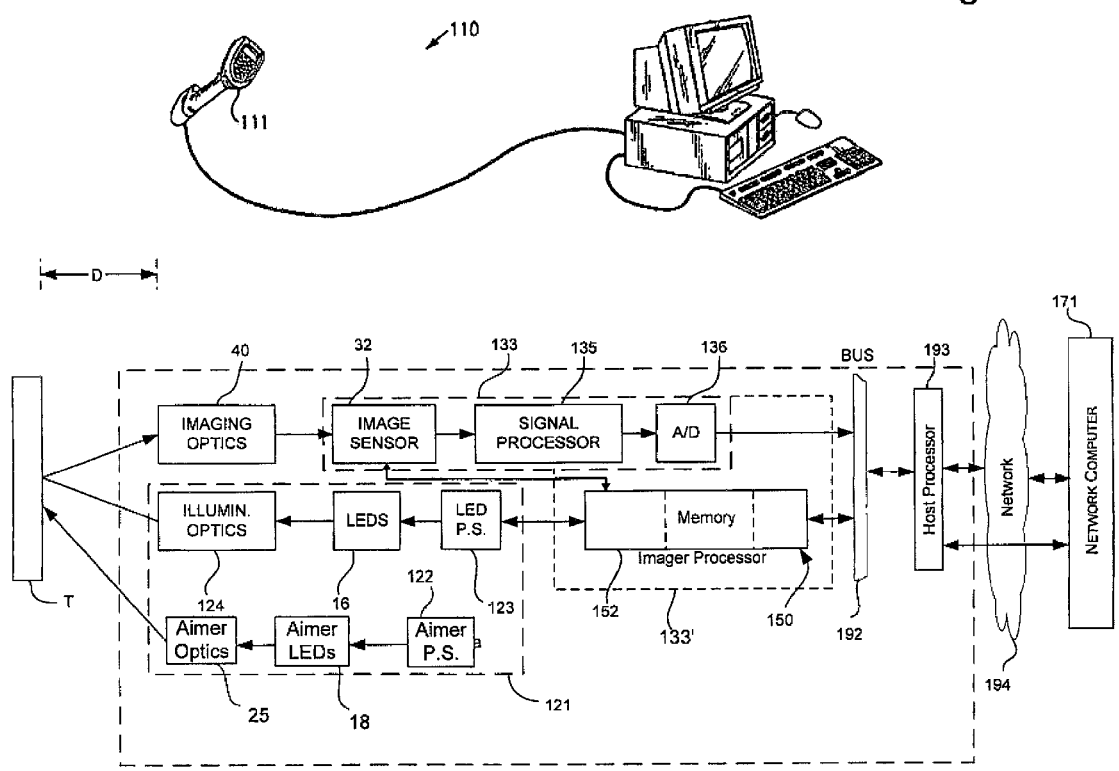
FIG. 3 is a block schematic diagram of an optical reader in accordance with the invention.

Referring to the block diagram of FIG. 3, an imaging device processor assembly 14a includes an illumination assembly 121 for illuminating a target area T, such as a substrate bearing a 1D or 2D bar code symbol or a text string or other machine readable indicia, and an imaging assembly 133 for receiving an image of object T and generating an electrical output signal indicative of the data optically encoded therein. Illumination assembly 121 may, for example, include an illumination source assembly e.g. LED power supply 123, Aimer power supply 122, LEDs 16, 18, together with an illuminating optics assembly 124, such as one or more lenses 25, diffusers 27, wedges 28, reflectors 640 or a combination of such elements, for directing light from light source 16, 18 in the direction of a target object T. The Illumination source may be located off-axis such as by locating it a distance from the imaging assembly or external to the reader. Illumination assembly 121 may comprise, for example, laser or light emitting diodes 16, 18 (LEDs) such as white, green or red LEDs. Illumination assembly 121 may include target illumination optics for projecting an aiming pattern e.g. 630, 631, 647 on target T. Illumination assembly 121 may be eliminated or disabled if ambient light levels are certain to be high enough to allow high quality images of object T to be taken. Illumination assembly 121 may also be located remote from imaging device housing 111, at a location so as to eliminate or reduce specular reflections. Imaging assembly 133 may include an image sensor 32, such as a color or monochrome 1D or 2D CCD, CMOS, NMOS, PMOS, CID or CMD solid state image sensor, together with an imaging optics assembly 40 for receiving and focusing an image of object T onto image sensor 32. CMOS based image sensors contain arrays of light sensitive photodiodes (or pixels) that convert incident light energy into electric charge. CMOS based image sensors allow each pixel in a two-dimensional array to be directly addressed, so that sub-regions of a full frame of image data can be independently accessed.

In another example, imaging assembly 133' may include image sensor 32, processors 135, 150, and ND 136. To this end, one or more of these components may be combined into a single chip or integrated circuit.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. The array-based imaging assembly may be replaced by a laser array based imaging assembly comprising one or more laser sources, a scanning mechanism, emit and receive optics, at least one photodetector and accompanying signal processing circuitry. It is to be noted that the image sensor 32 may read images without the illumination from illumination assembly 121, such as by ambient light.

Imaging device processor assembly 14a may include a programmable control circuit or imager processor 150. Imager processor 150 controls the amount of illumination provided by LEDs 16, 18 by controlling the output power provided by LED power supply 19. Imager processor 150 may also control other functions and devices of the imager. Image processor may be a CY8C24223A made by Cypress Semiconductor Corporation, which is a Mixed-Signal Array with On-Chip Controller devices designed to replace multiple traditional MCU-based system components with one single-chip programmable device. The processor may include configurable blocks of analog and digital logic, as well as programmable interconnects. Processor 150 includes a predetermined amount of memory 152 for storing data.

The components in imaging device processor assembly 14a may be connected by bus 192, such as an Inter-IC bus such as an I²C bus, which is a control bus that provides a communications link between integrated circuits in a system. Typically this bus would connect to a host computer in relatively close proximity, but not necessarily on the same printed circuit board as used by the imaging device processor assembly 14a. I²C is a two-wire serial bus with a software-defined protocol and used to link components such as the image sensor 32, temperature sensors, voltage level translators, EEPROMs, general-purpose I/O, A/D and D/A converters, CODECs, and microprocessors.

The functional operation of the host processor 193 involves the performance of a number of related steps, the particulars of which may be determined by or based upon certain parameters, some or all of which may be stored in memory 152 provided as part of the imager processor 150. Included among these steps is a scanning subroutine which specifies the address buffer space or spaces in which scan data will be stored and whether scanning is to be continuous (e.g., at a full video rate, such as 30 frames per second), or discontinuous (e.g., with pauses related to the current state of the trigger). The operation of the decoding routine, which is executed in a user or factory selectable relationship to the scanning routine, is governed by parameters which control the codes which are enabled for processing as a part of an autodiscrimination process, whether decoding is to be continuous or discontinuous, etc. Permitted combinations of scanning and decoding parameters together define the scanning-decoding relationships or modes which the reader will use.

Memory 152 may also be used to store other parameters. For example, the decoder functions best if it knows the aiming pattern 74 center coordinates or other position in order to decode the symbol that is closest to the aiming center parameter, or the symbol that is in some position relative to the aiming center. The aiming center is based on a number of mechanical tolerances and will generally be different for every device produced. One could choose a center coordinate based on a statistical sampling of data, but the center may move over time as the manufacturing process is changed. The aiming center x- and y-coordinate can be measured during the manufacturing process and stored in the processor memory 152. The distance D at which the measurement was made may also be stored. One could measure the coordinates at two different distances and then apply a mathematical translation to determine what the coordinates would be at a third distance. The center coordinates and the distance could be read out at a later point in time. Knowledge of aimer location may be used for turning the aiming pattern on and off as is described herein.

During the manufacture of a scanner, the different tolerances of the different parts have a tendency to "stack up", or add together. Such a tolerance stack may result in problematic performance. For instance, it may lead to a situation where the aimer pattern 74 does not intersect the center pixel area of the sensor 32. This misalignment due to tolerance will give poor results unless such an aiming pattern "offset" is compensated for by the signal processor in a calibration step. Storing the aiming pattern offset or position in the processor memory will facilitate such calibration at future times, such as repairs or customer locations. Aimer pattern location may also be used in controlling the aimer on and off during exposure of the image sensor.

Another exemplary parameter to be stored for the scan driver to utilize is the type of aiming system that is employed in order to control the aimer. Examples of aiming systems are LED and laser aimer options, which may require different control methods.

Another exemplary parameter to be stored is image module, engine part number or serial number, or other manufacturing specific information which may be used for a number of tracking purposes, such as software control, sales tracking or warranty tracking.

Another exemplary parameter to be stored is the number of pixels in the image to be used for initializing buffers and for software control.

Another exemplary parameter to be stored is the orientation that the engine will be mounted in its final implementation for decoding algorithms that are direction-dependent, or for ensuring that images are displayed and stored in the proper orientation from the operator's point of view.

Another exemplary parameter to be stored is information about the field illumination flatness of the engine with and without on-board illumination activated, for instance for purposes of applying compensation algorithms that either improve decoding or improve the visual quality of the image. Field illumination flatness may be defined as a profile saved as a function of radius from the imager optical centerline.

Another exemplary parameter to be stored is information regarding lens distortions across the active image field that may be used to improve decoding or to improve the visual quality of the image.

Other exemplary parameters to be stored may include dead or bad pixel identification for image correction, noise characterization of the image sensor so that the image algorithms can correct for and function appropriately.

Other exemplary parameters to be stored may include max LED current and receiving lens prescription or parameters functionally related thereto.

Another exemplary parameter to be stored is information regarding a parameter representative of the operative power output of the laser diode aiming system, such as operating current or a parameter related to the operating current.

In the present invention for instance, if the image scan engine 110, 110a is replaced, the scanner has the ability to automatically read out certain parameter information in processor memory and can thus sense when an engine has been replaced and allow the software to adapt and use different methods of control, or different methods of decoding, or different methods of displaying and saving images, etc.

Another exemplary application for the present invention is to compare run time parameter data of the image scan engine with the stored parameters for diagnostic evaluation. This may be done locally or remotely by connecting the optical reader either directly or through a network 194 (such as the internet) to a remote network computer 171 and having the network computer provide appropriate diagnostics.

Another exemplary application for the present invention is to store information about the scanner capabilities, such as whether the imager is enabled for image capture, what type of decoder level is enabled, or what types of symbology decoding is enabled. To this end, the user may update or replace one or more stored parameters or parameter data utilizing a remote updating system. This may be done by connecting the optical reader either directly or through a network 194 (such as the internet) to a remote network computer 171. With the appropriate software, the network computer can be programmed to read certain parameters from the optical reader, such as software configuration. The network computer 171 could read the parameter data and utilize that data for downloading updates or new software. For instance, an operator may request from the network computer for a software update. The request would be received by either computer, which could read the current software configuration resident on the optical reader and determine the appropriate update or replacement software.

Figure 4:
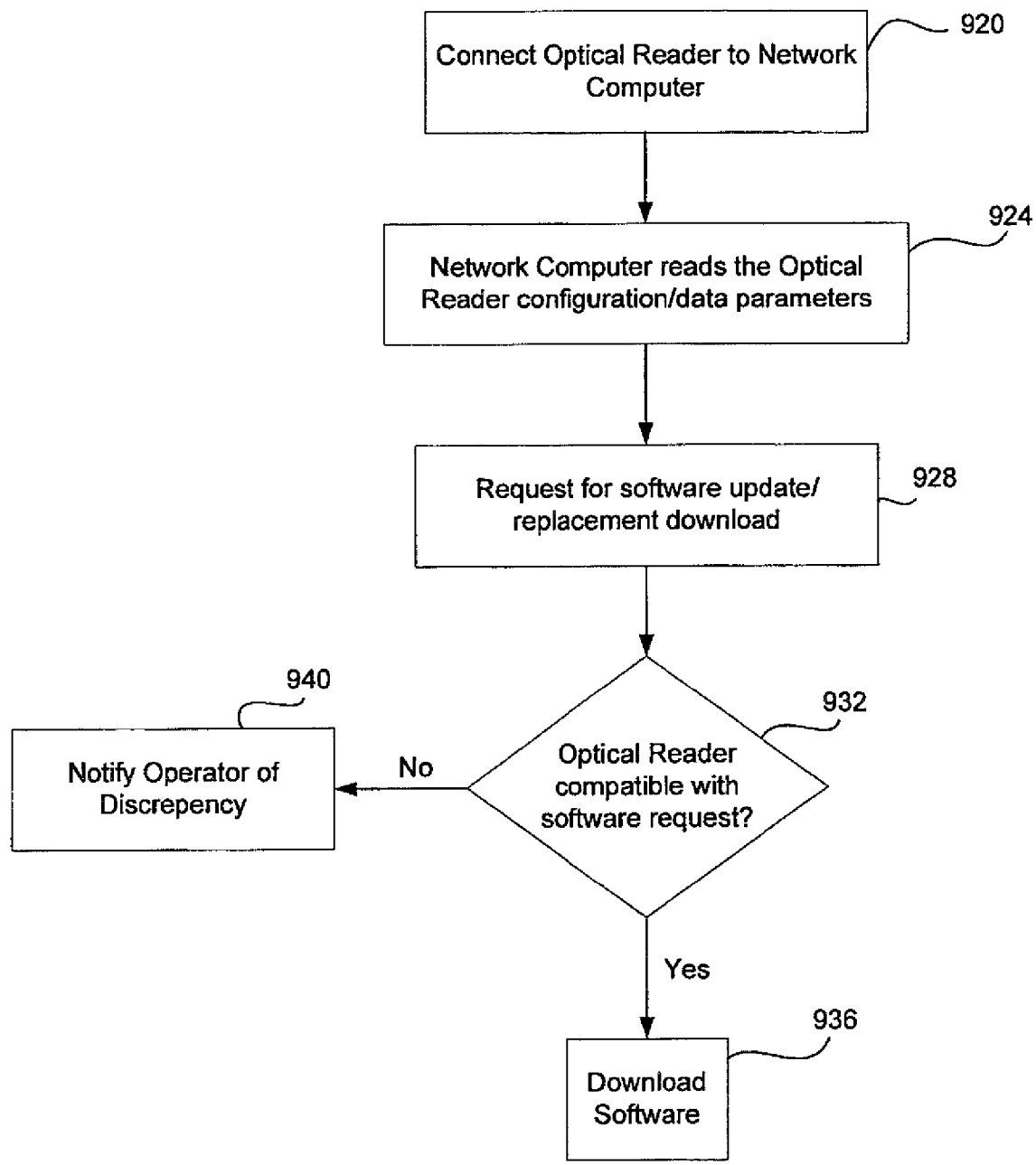
FIG. 4 is flow chart for operating an optical reader system in accordance with the invention.

An operator may have the ability to acquire through a purchase or otherwise new or updated software following the flow chart provided in FIG. 4. In a step 920 an optical reader is connected to a network computer. In a step 924, the network computer reads the optical reader configuration/data parameters from memory. In a step 928, the operator requests from the network computer a software update/replacement download from the network computer. In a step 932, the network computer verifies the optical reader is compatible with the software request. This may entail such things as verifying optical reader has requisite hardware or software, or verifying the operator has fulfilled certain contractual obligations, such as making appropriate payments or agreeing to contractual terms. If the reader is compatible, the software can be downloaded in a step 936. If not, the operator is notified in a step 940. The network computer may host a website on the internet utilizing HTML technology for providing the interface for the software download. Other interfaces and systems may also be utilized. The processor 150 may therefore be programmed to update the data and software utilizing a remote updating system.

Figure 5A:
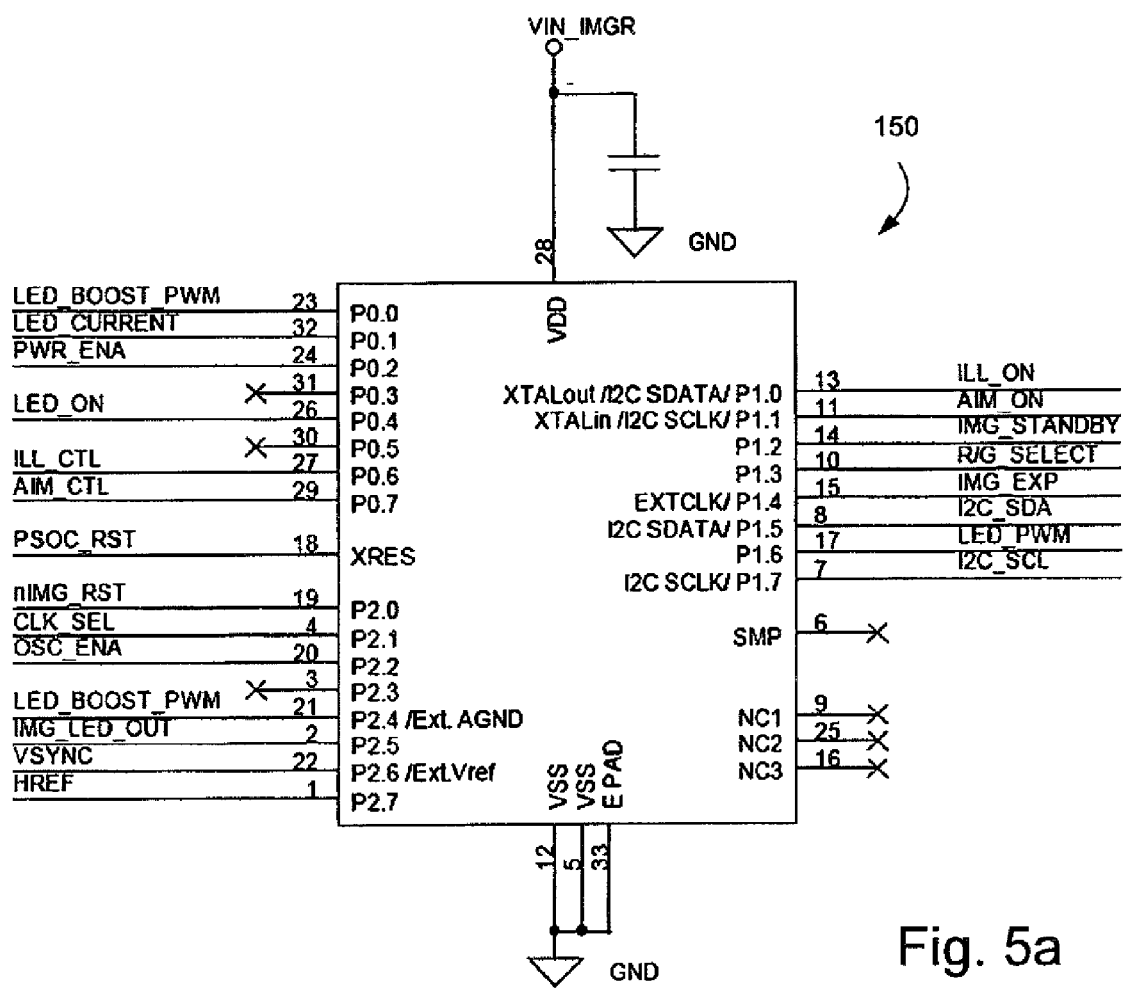
FIG. 5a is a schematic diagram of an imager processor in accordance with the present invention.
Figure 5B:
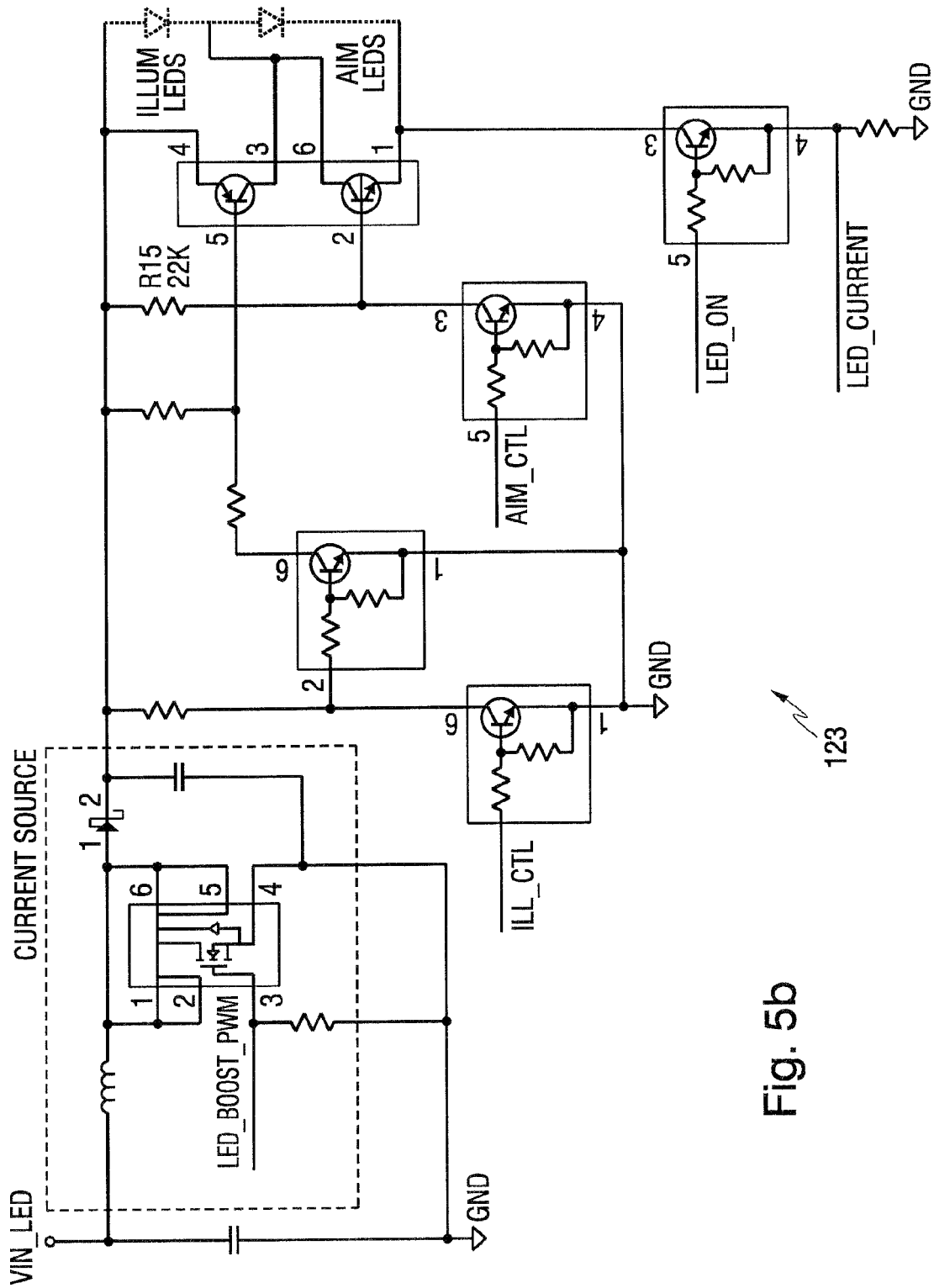
FIG. 5b is a schematic diagram of a aimer and illumination control circuit in accordance with the present invention.

FIGS. 5a-b, are schematics of an imager processor 150 and LED control circuit 123 for an optical reading device in accordance with the present invention. It can be seen that imager processor 150 controls the power to the illumination LEDs via a line ILL_CTL and the power to the aimer LEDs via a line AIM_CTL. Feedback for the amount of LED current is provided on a line LED_CURRENT. Through the control lines ILL_CTL and AIM_CTL, the image field illumination and aiming pattern illumination can be independently controlled.

Figure 6:
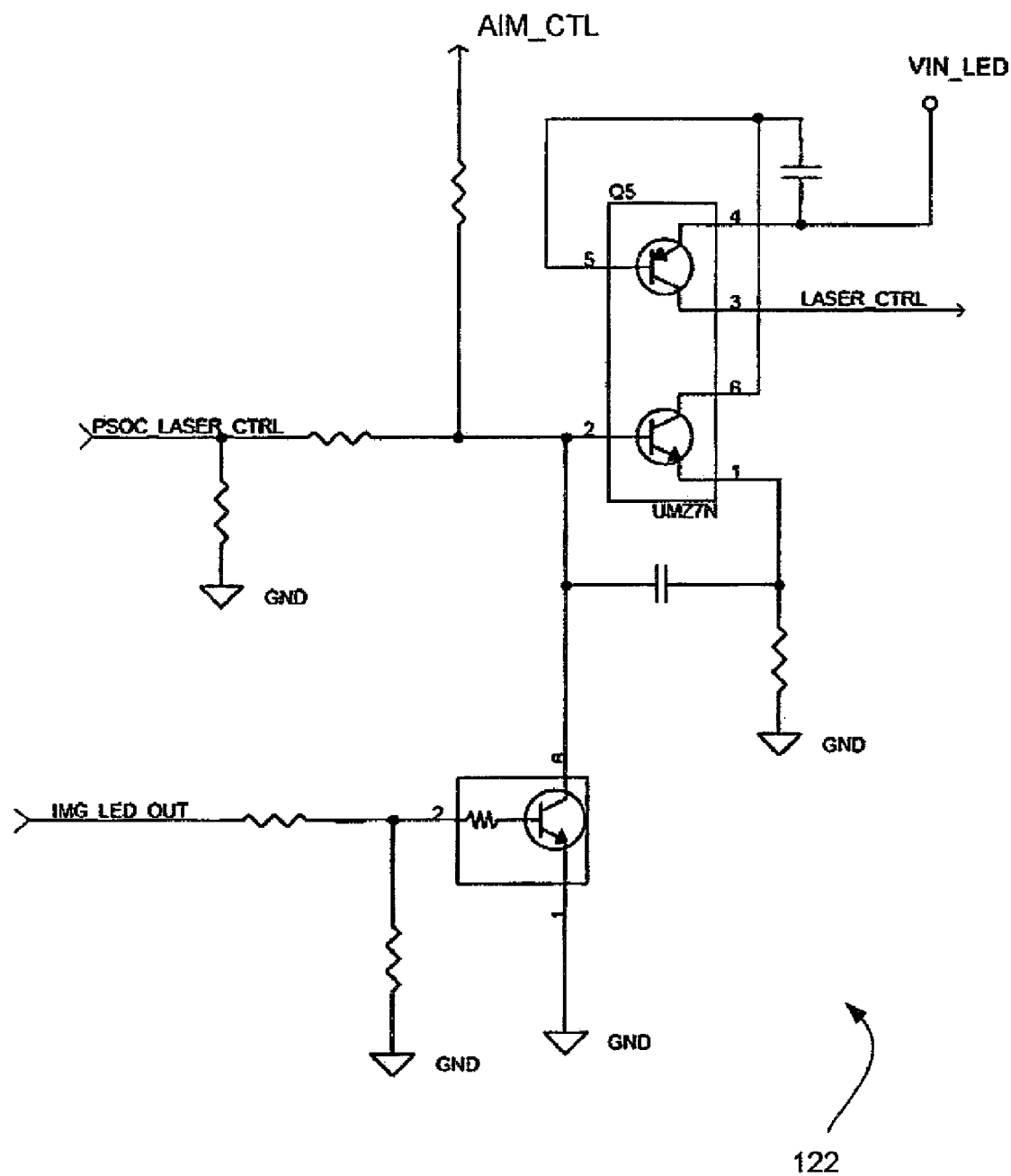
FIG. 6 is a schematic diagram of a laser aimer control circuit in accordance with the present invention.

An example of a laser aimer power supply 122 circuit is shown in FIG. 6.

Figure 7:
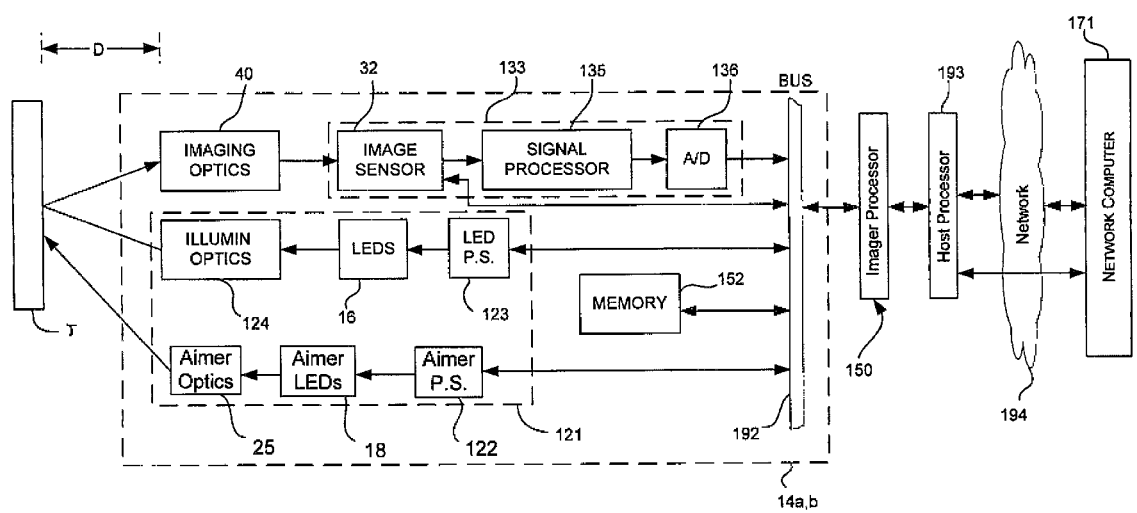
FIG. 7 is a diagram of an optical reader in accordance with the present invention.

An embodiment in accordance with the present invention is shown in FIG. 7, which is similar to that shown in FIG. 3 except that memory 152 is not part of or integral with the imager processor 150. The imager processor 150 may be located remotely from imager printed circuit board (PCB) 14a, or imager assembly 10, or optical reader 114k. If so, memory device 152 may be located on the PCB for storing the aforementioned parameters. The bus 192 may still be utilized for data transfer on the imager PCB. An alternate connection might also be utilized for communication between the imager processor 150 and the imager PCB. A configuration with only the memory and not the processor on the PCB facilitates a smaller optical reader package. It is to be noted that imager processor 150 and host processor 193 may be a single integrated circuit or separate processors disposed on a single printed circuit board.

As herein described, image sensor 32 may comprise a two-dimensional CMOS based image sensor array. The illumination LEDs shine light on the target so that reflected light can be collected and processed by the image sensor array. The Aimer LEDs shine light on the target to aid an operator of the image reader to accurately aim the reader at the target.

Figure 8A:
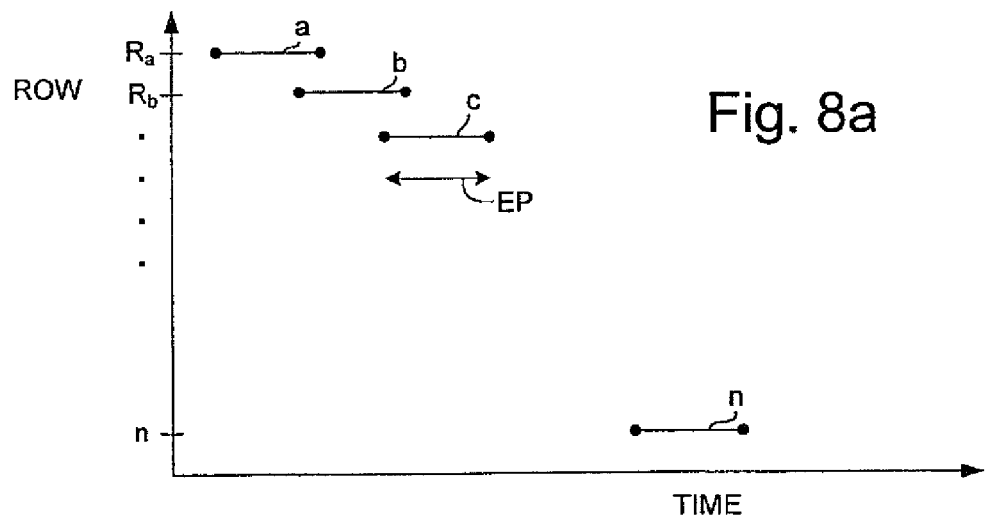
FIG. 8a illustrates the operation of an image sensor employing a rolling shutter architecture in accordance with the present invention.
Figure 8B:
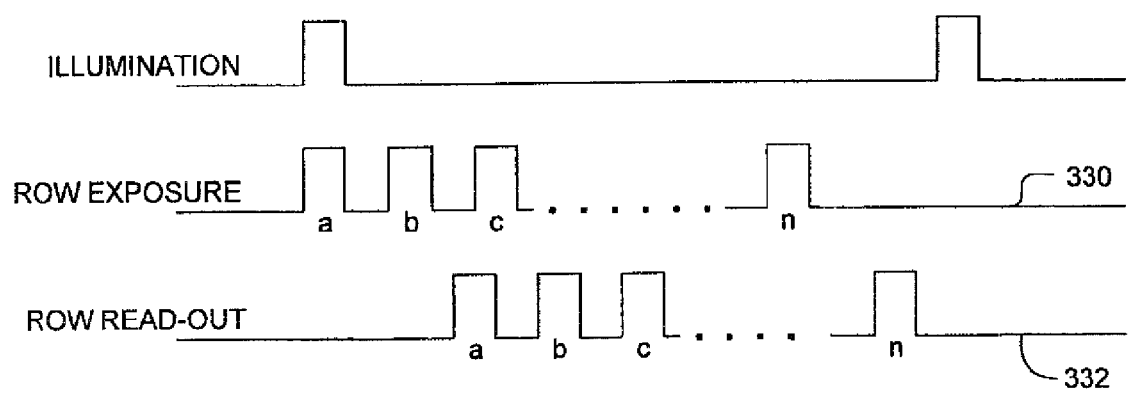

The CMOS sensor array may employ a "rolling shutter" architecture to expose the pixels, wherein rows of pixels are activated or exposed and read in sequence. The exposure or integration time for a pixel is the time between a pixel being reset and its value being read-out. This concept is presented in FIG. 8a. In FIG. 8a, the exposure for each of the rows "$R_a$" though "$R_n$" is diagrammatically represented by the bars a . . . n. The horizontal extent EP of each bar is intended to correspond to the exposure period for a particular row. The horizontal displacement of each bar is suggestive of the shifting time period during which each row of pixels is exposed. This is shown in more detail with respect to the timing diagrams for a rolling shutter architecture shown in FIG. 8b. The second line of the timing diagram represents a row exposure timing signal 330 pulse train. The third line represents a row readout timing signal 332 pulse train. These timing signals are generated by the image sensor 32. As shown in both FIGS. 8a and 8b, the exposure for row "b" is initiated before the values for row "a" are read-out. The exposure periods for adjacent rows of pixels typically overlap substantially as several hundred rows of pixels must be exposed and read during the capture of a frame of data. As shown by the illumination timing signal on the first line, the rolling shutter architecture with its overlapping exposure periods requires that the illumination source remain on during substantially all of the time required to capture a frame of data so that illumination is provided for all of the rows. In this manner the optical reader reads symbol indicia and produces digital symbol image data representative of the symbol indicia, the digital symbol image data being comprised of pixels systematized into rows wherein each pixel has a digital value.

Figure 9:
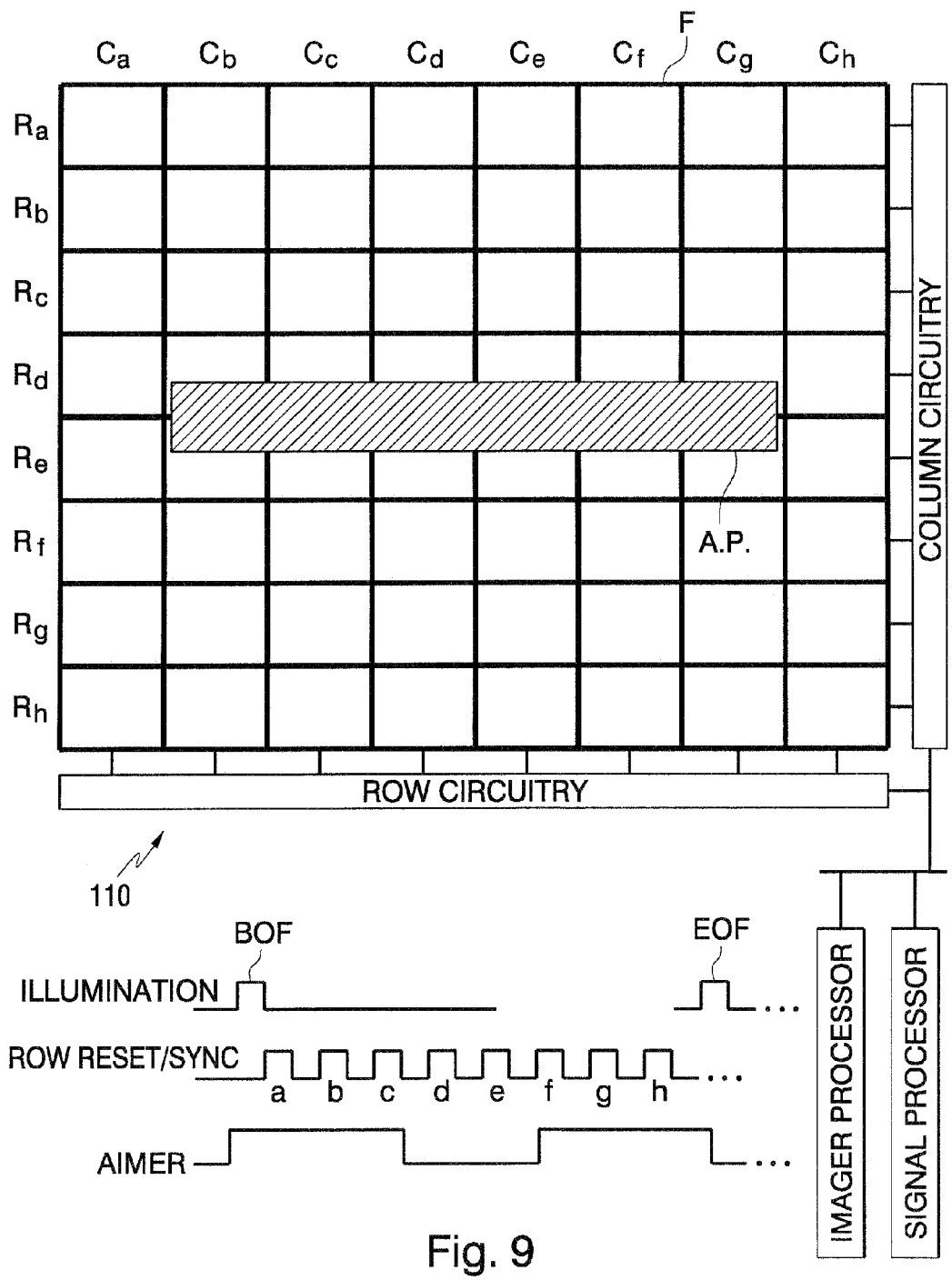
FIG. 9 is a block electrical diagram and timing circuit for image sensor in accordance with the present invention.

An exemplary image reader 110 is described with reference to FIG. 9, wherein a two-dimensional array of pixels is incorporated onto CMOS image sensor array adapted to operate in a global shutter operating mode. Row circuitry and the column circuitry may enable one or more various processing and operational tasks such as addressing pixels, decoding signals, amplification of signals, analog-to-digital signal conversion, applying timing, read-out and reset signals and the like.

The time during which the target is illuminated is referred to as the illumination period. The time during which the aimer LEDs are on is referred to as the aiming period. The time during which the pixels are collectively activated to photo-convert incident light into charge defines the exposure period for the sensor array. The exposure period for each row is controlled by a timing signal referred to as a row exposure timing signal. At the end of the exposure period, collected charge is read out.

The timing of the exposure period and the illumination period may be under the control of the control module or imager processor 152, which causes at least a portion of the exposure period to occur during the illumination period. The imager processor also organizes and processes the reading out of data from the sensor array in a rolling shutter mode capable of sequentially exposing and reading out the lines of pixels in the image sensor array. The time during which the pixels are collectively activated to photo-convert incident light into charge defines the exposure period for the sensor array. At the end of the exposure period, the collected charge is transferred to a shielded storage area until the data is read out. Imager processor 152 controls the process to collect the pixel matrix information utilizing an illumination signal and a row reset signal. The illumination (or beginning of frame) signal indicates the beginning of data collection for the frame F (pixel matrix). Among other things, the imager processor 152 uses this signal to know when the image capture begins and ends with the complete frame or image being stored in system memory. The row exposure timing signal is a train of pulses used to time the collection of data for each row $R_a$-$R_n$ (or data block) in the frame. Imager processor 152 generates an aimer control signal (AIM_CTL) to turn the aimer LEDs on and off.

An aspect of the present invention is to control the on/off sequence of the illumination of the aiming pattern so that the aiming pattern is turned off during predetermined times of image collection, such as when data is being collected from the pixel matrix in areas where the aiming pattern is being projected or superimposed onto the target. It may be desirable to produce a digital image of the target without the aiming pattern superimposed on the picture. A technique which may be utilized to accomplish this objective is to use the row read-out pulses to calculate when data is being collected in the pixel matrix rows that include the superimposed aiming pattern. For example as shown in FIG. 8, the aiming pattern might be imposed in the frame F in the fourth and fifth rows $R_d$ and $R_e$. Data from the matrix is collected iteratively from each consecutive row during each consecutive row readout pulse. The aiming pattern might thus be turned off by counting the number of row exposure pulses after the illumination sync pulse, and turning off the aiming pattern at the appropriate row coinciding with the respective row readout pulse count, and then turning on the aiming pattern at the appropriate row coinciding with the respective row readout pulse count. So for the example in FIG. 9, it can be seen that the aiming pattern AP may be turned off to coincide with the third row exposure pulse occurring after the beginning illumination sync pulse BOF (beginning of frame) and turned back on at the leading edge of the sixth row exposure pulse occurring after the beginning illumination sync pulse BOF. Since the position of the aiming pattern within the frame is known, the appropriate row exposure pulse counts are known and may be stored in the imager processor memory 152 to be utilized for such aiming pattern on-off control. The frame illustrated in FIG. 9 is for example only. Typically, an image capture frame would consist of more pixel rows and columns than that shown.

Figure 10A:
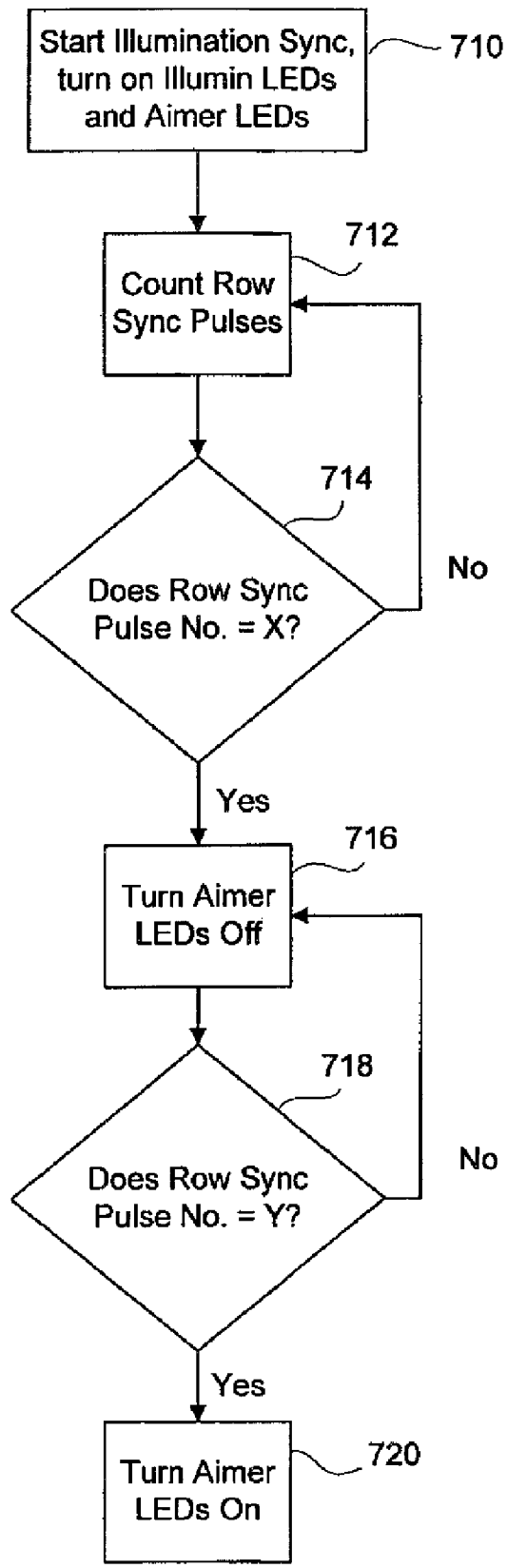
FIGS. 10a and 10b are flow charts of processes for collecting image data in accordance with the invention.

FIG. 10a is a flow chart depicting the aiming pattern operation. A illumination sync pulse is generated to begin image capture of the frame in a step 710. A row exposure pulse train is then generated in a step 712. The image pixel data from each row is iteratively collected coincident with the following row exposure pulses. Each row exposure pulse is counted by the imager processor 150 and a query is made in a step 714 to determine when the appropriate row is encountered (in the example of FIG. 9, the fourth row) where the aiming pattern resides. When the appropriate row exposure pulse (i.e. row number) is reached, the aimer is turned off in a step 716. The aimer remains off until, in a query in step 718, the next appropriate row number is reached (in the example of FIG. 9, the sixth row), at which time the aimer may be turned back on in a step 720. In this manner, the aimer pattern will not be included in the pixel data collected in rows $R_d$ and $R_e$. It is to be noted that other rows before and after the aiming pattern may be chosen as the predetermined signal switching rows to, for example, provide a wider tolerance to ensure the aiming pattern is turned off and on outside of the image capture frame coincident with the rows superimposed with the aiming pattern. Also, as noted previously, other aiming patterns may be utilized.

Alternatively, the aimer may be left on for a predetermined amount of time after a predetermined row exposure pulse.

Also, the aimer may be controlled utilizing any of a number of sync signals or pulses provided by the image sensor for providing information with regard to when pixel data is available for read out. For instance, in addition to the exposure sync signal, the vertical sync signal (Vsync) the horizontal sync signal (Hsync), the pixel clock signal (Pixel clock), etc.

Figure 10B:
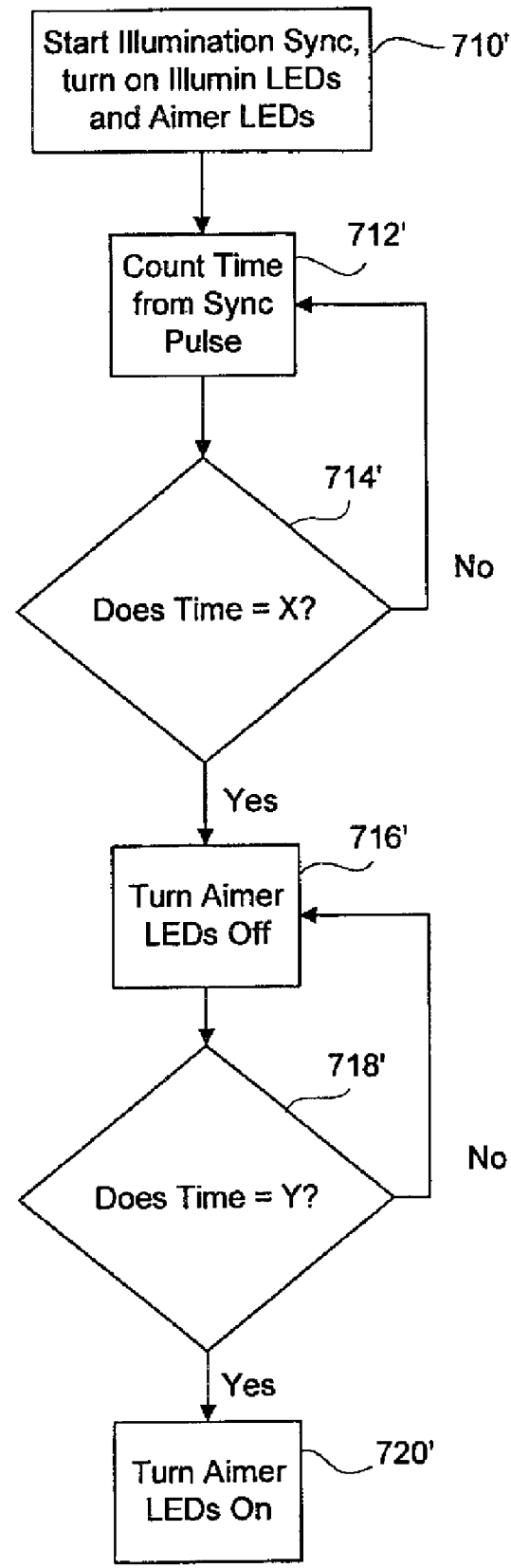
Figure 11:
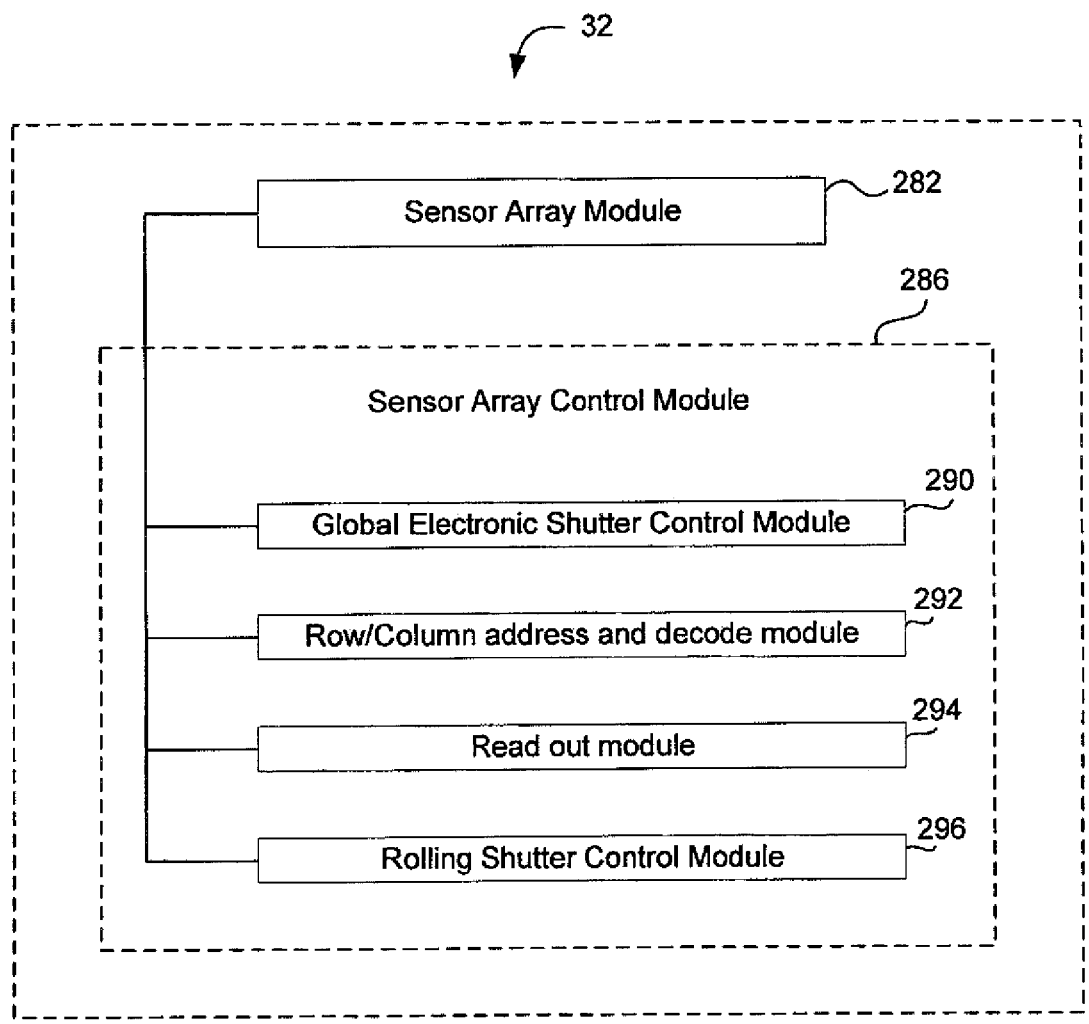
FIG. 11 is a block diagram of an image sensor in accordance with the present invention.

FIG. 10b is a flow chart depicting the aiming pattern operation. A illumination sync pulse is generated to begin image capture of the frame in a step 710'. A row exposure pulse train is then generated in a step 712'. The image pixel data from each row is iteratively collected coincident with the following row exposure pulses. Time is counted by the imager processor 150 and a query is made in a step 714' to determine whether a first predetermined amount of time has elapsed. When the appropriate time is reached, the aimer is turned off in a step 716'. The aimer remains off until, in a query in step 718', for a second predetermined amount of time at which time the aimer may be turned back on in a step 720'. In this manner, the aimer pattern will not be included in the pixel data collected in rows $R_d$ and $R_e$. It is to be noted that other rows before and after the aiming pattern may be chosen as the predetermined signal switching rows to, for example, provide a wider tolerance to ensure the aiming pattern is turned off and on outside of the image capture frame coincident with the rows superimposed with the aiming pattern. Also, as noted previously, other aiming patterns may be utilized.

The image reader may be capable of operating in either the rolling shutter mode or a global electronic shutter mode. In the global electronic shutter operational mode, the image reader 32 collects a full frame of image data wherein all image reader pixels are exposed nearly simultaneously and the data is stored and subsequently processed to, for example, decode a barcode contained in the image data.

Figure 12:
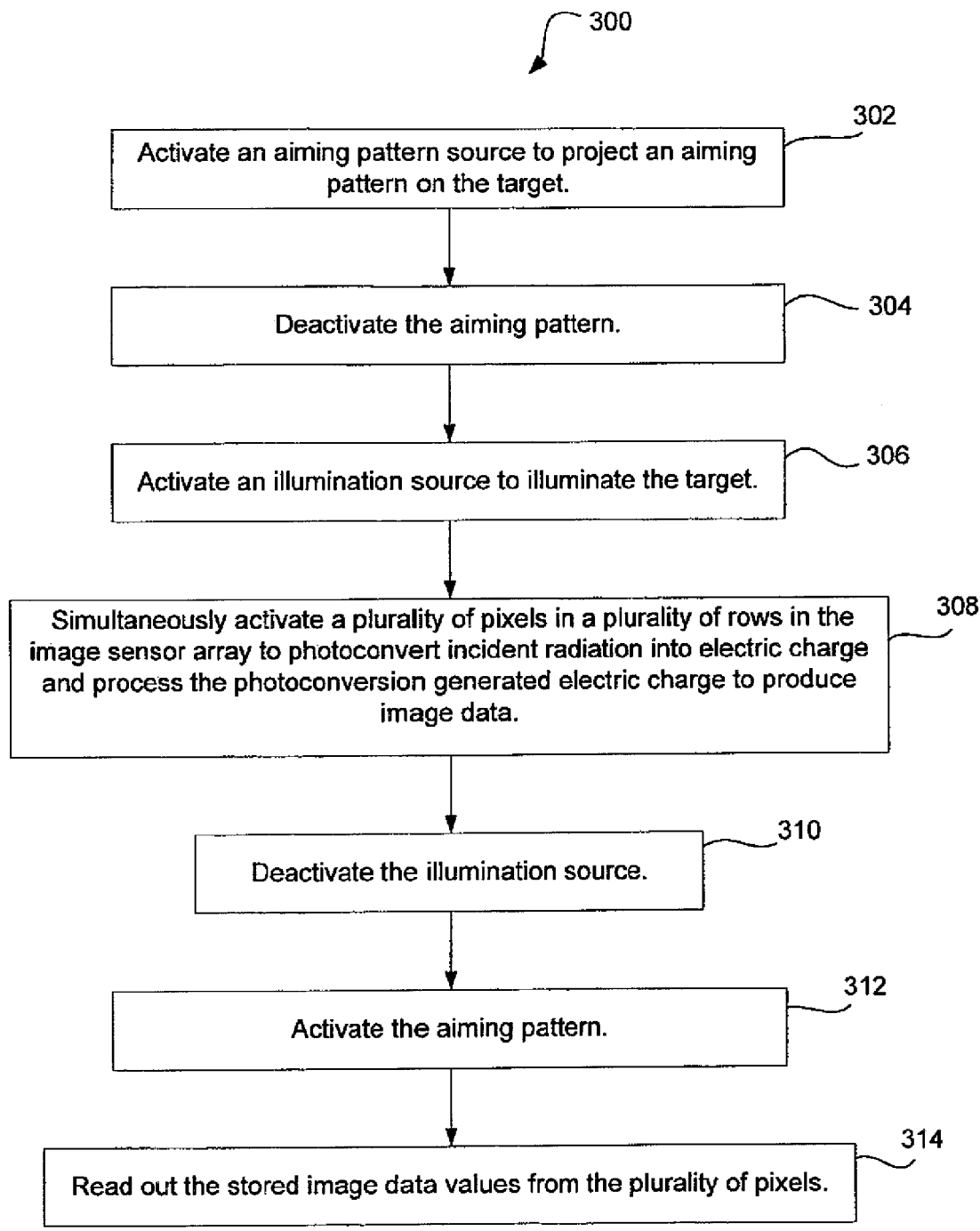
FIG. 12 is a flow chart of a process for collecting image data in accordance with the invention.
Figure 13:
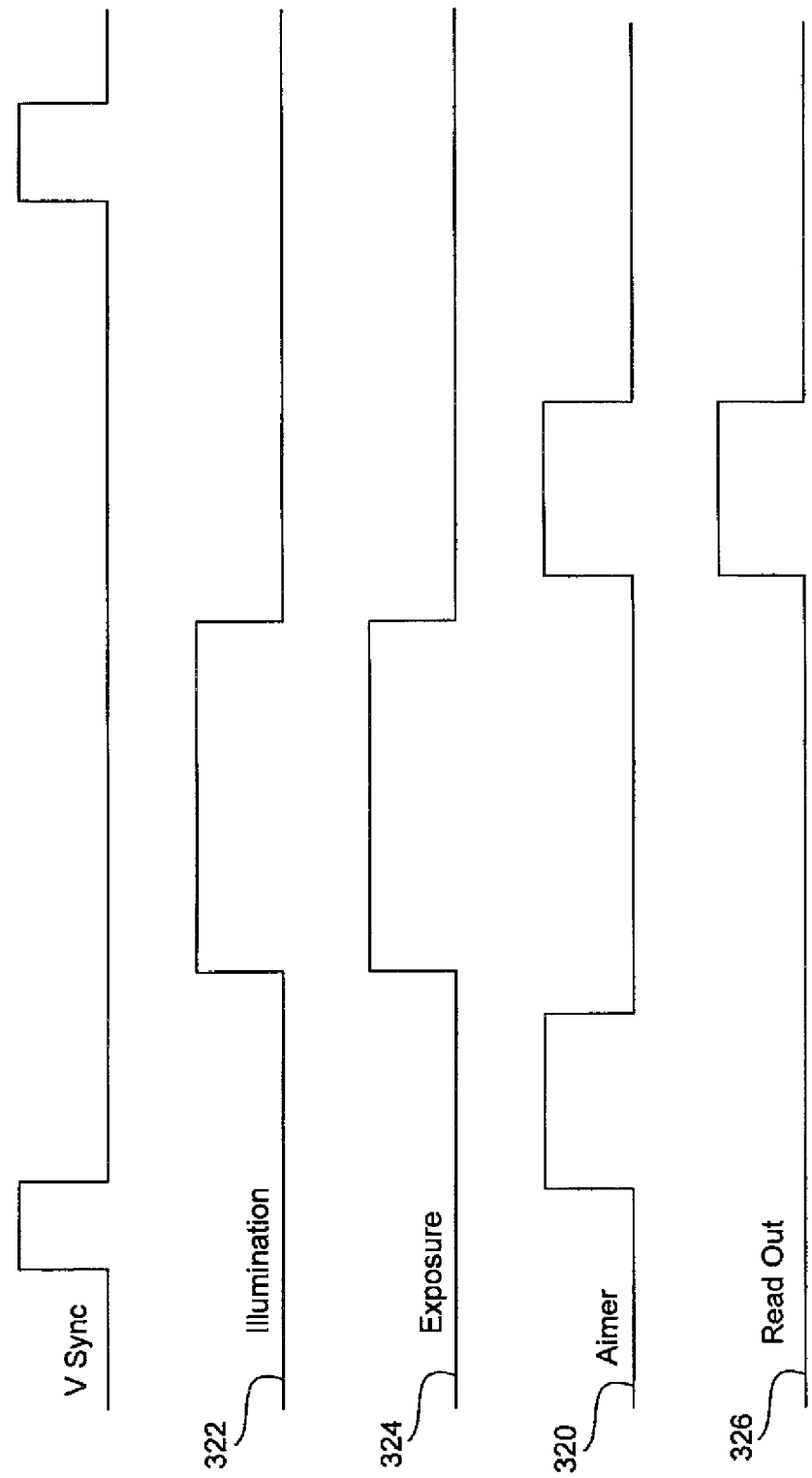
FIG. 13 is a timing diagram used in the global shutter architecture in accordance with the invention.
Figure 14:
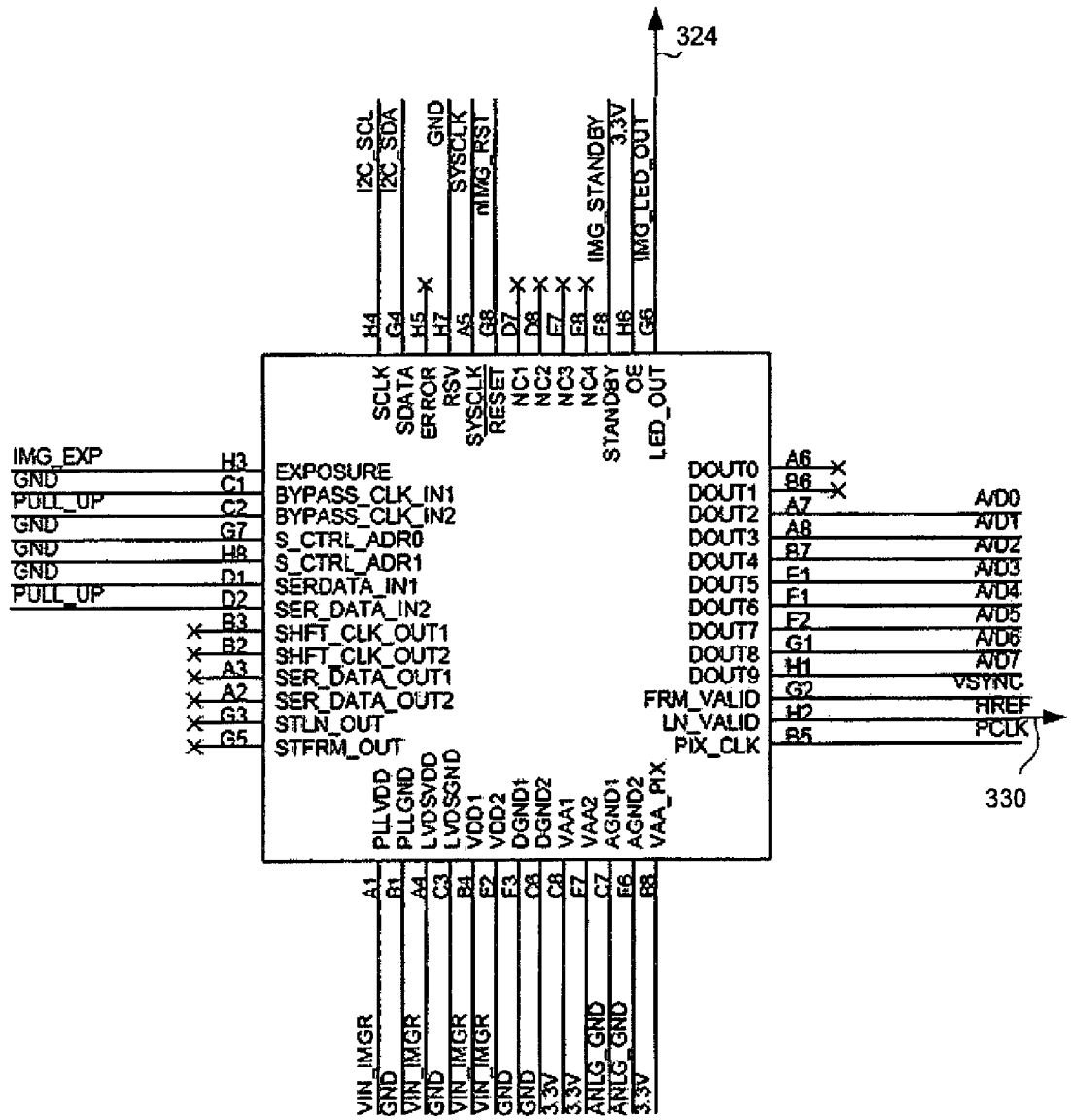
FIG. 14 is a diagram of an image sensor in accordance with the present invention.

A process 300 for collecting target image data in the global electronic shutter operational mode is presented with respect to FIGS. 12, 13, and 14 and includes projecting (step 302) an aiming pattern on the target in response to an aimer control timing pulse 320. The aiming pattern appears on the target the duration of the aimer control timing pulse. The aiming pattern is then deactivated in a step 304. In a step 306 an illumination source illuminates the target in response to an illumination control timing pulse 322. Illumination of the target occurs for the duration of the illumination control timing pulse 322. The process 300 also includes simultaneously activating (step 308) a plurality of pixels in a plurality of rows in an image sensor array to photoconvert incident radiation into electric charge. The simultaneous activation of the plurality of pixels occurs in response to an exposure control timing pulse 324. The illumination source is deactivated in a step 310. The aiming pattern is activated in a step 312. Read out the stored image data values from the plurality of pixels is performed in a step 314 in response to a readout control timing pulse 326.

In an exemplary embodiment, the image reader utilizes the exposure control timing pulse 324 to generate the aimer control timing pulse 320. For example, an image sensor manufactured by Micron Technology, Inc. having a product number MT9V022 provides a control signal output, labeled IMG_LED_OUT (see FIG. 14) which is a signal indicative of image sensor exposure occurring. This signal can be utilized to control or provide one or more of the aiming pattern, illumination, exposure and readout control timing signals. For example, a transition of the IMG_LED_OUT signal could trigger a transition in the aiming control timing signal after a predetermined time period or no time period to turn the aiming pattern LEDs off. Shortly thereafter, the illumination and exposure control timing signals are programmed to transition to turn on the illumination LEDs to illuminate the target and start exposure of the image sensor. A subsequent transition in the illumination and exposure control timing signals to "off" would trigger a transition in the readout timing control signal and possibly the aiming pattern timing control signal, to turn the aiming pattern back on.

In an exemplary embodiment, the image processor 150 provides a timing control signal which is utilized to control the aiming pattern (AIM_ON), illumination (ILL_ON), exposure IMG_EXP) and readout control timing signals, as exemplified in FIG. 5a.

In one embodiment the target is illuminated by overdriving the illumination sources, such as LEDs, to generate illumination several times brighter than standard operation. According to this embodiment, the overdriven illumination sources in combination with the electronic global shutter allows for short exposure periods. That is, the bright illumination allows for a short integration time for each pixel and the global electronic shutter allows for all of the pixels in the image sensor to be simultaneously exposed. With a short exposure period for a brightly illuminated target, an image reader of the present invention is able to collect a sharp non-distorted image even when the target is moving relative to the image reader. In one embodiment, the exposure period is less than 3.7 milliseconds. In one embodiment in which the light sources are overdriven, light sources with different colors are employed. For example, in one such embodiment the image reader includes white and red LEDs, red and green LEDs, white, red, and green LEDs, or some other combination chosen in response to, for example, the color of the symbols most commonly imaged by the image reader. In this embodiment, the different colored LEDs are each alternatively pulsed at a level in accordance with the overall power budget. In another such embodiment, both colored LEDs are pulsed each time but each at a relatively lower power level so that the over all power budget is again maintained. In a further embodiment, red, green, and blue LED's can be interleaved to simulate white light.

As noted, the process 300 includes processing the photo-conversion generated electric charge to produce image data which can include amplifying the data generated from the incident radiation and converting the generated data into a digital signal. The processing further includes storing the generated image data values in a shielded portion of each of the plurality of pixels. The process 300 additionally includes reading out the stored image data values from the plurality of pixels. The reading out of the plurality of pixels may be controlled by a readout timing control pulse which may include a plurality of pulses transmitted to each of the plurality of pixels.

In an exemplary embodiment, the exposure control timing pulse begins after and finishes before the illumination control timing pulse. The readout control timing pulse begins at the conclusion of the illumination control timing pulse. In another embodiment, the illumination control timing pulse begins after and finishes before the exposure control timing pulse. In this embodiment, the readout control timing pulse begins at the conclusion of the exposure control timing pulse. In further embodiments the exposure control timing pulse and the illumination control timing pulse overlap each other while occurring sequentially. In one such embodiment, this sequential operation can include the illumination control timing pulse starting, the exposure control timing pulse starting, the illumination control timing signal pulse ending, and then the exposure control timing pulse ending. In this embodiment, the readout control timing pulse begins at the conclusion of the exposure control timing pulse.

In an embodiment, the illumination source illumination control timing signal pulse is coincident with the exposure control timing pulse, so that the illumination LEDs are on only during the exposure period. Operating the illumination source in this manner reduces power consumption since the illumination source is on only during the exposure period thereby increasing battery life.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. An apparatus comprising:
a sensor array having rows of pixels which are exposed to a target, wherein the sensor array generates a sync signal;
an aiming pattern generator for producing an aiming pattern superimposed on the target;
a processor which utilizes the sync signal to control the aiming pattern generator to:
turn on the aiming pattern during exposure of a first predetermined row of pixels;
turn off the aiming pattern during exposure of a second predetermined row of pixels;
turn on the aiming pattern during exposure of a third predetermined row of pixels; and,
a housing for housing the sensor array, aiming pattern generator and processor.

2. An apparatus in accordance with claim 1, wherein the processor has memory and the processor stores identification information of the first and second predetermined rows in the memory.

3. An apparatus in accordance with claim 1, further comprising memory which stores identification information of the first and second predetermined rows.

4. An apparatus in accordance with claim 3, wherein the processor and memory are provided in the same integrated circuit package.

5. An apparatus in accordance with claim 1, wherein the processor counts the sync signal to determine the first and second predetermined rows.

6. An apparatus in accordance with claim 1, wherein the sync signal is indicative of exposure of each pixel row.

7. An apparatus in accordance with claim 1, wherein the sync signal is comprised of at least one of the following: exposure sync signal; vertical sync signal; horizontal sync signal; and, pixel clock signal.

8. An apparatus in accordance with claim 1, wherein the housing is adapted for hand held operation.

9. An apparatus in accordance with claim 1, wherein the target is symbol indicia.

10. A method of reading a target with a hand held device comprising the steps of:
exposing a sensor array to the target, the sensor array having rows of pixels; utilizing an on board processor for:

turning on an aiming pattern superimposed onto the target during exposure of a first predetermined row of pixels;

turning off the aiming pattern during exposure of a second predetermined row of pixels.

11. A method in accordance with claim 10, wherein the processor has memory and further comprising the step of storing identification information of the first and second predetermined rows in the memory.

12. A method in accordance with claim 10, further comprising storing in memory identification information of the first and second predetermined rows.

13. A method in accordance with claim 12, wherein the processor and memory are provided in the same integrated circuit package.

14. A method in accordance with claim 12, wherein the utilizing step comprises counting the sync signal to determine the first and second predetermined rows.

15. A method for operating a hand held optical reading device comprising the steps of:

projecting an aiming pattern onto the target;

exposing one or more rows of pixels in the image sensor;

providing a plurality of row sync pulses;

determining a row sync pulse count representative of each row of pixels;

utilizing an on board processor for turning off the aiming pattern in response to a first predetermined row sync pulse count; and, turning on the aiming pattern in response to a second predetermined row sync pulse count.

16. A method in accordance with claim 15, further comprising the step of storing the first and second predetermined row sync pulse count in memory of a processor.

17. An apparatus comprising:

a sensor array having rows of pixels which are exposed to a target, wherein the sensor array generates a sync signal indicative of exposure of each pixel row;

an aiming pattern generator for producing an aiming pattern superimposed on the target;

a processor which utilizes the sync signal to control the aiming pattern generator to:

turn on the aiming pattern during exposure of a predetermined row of pixels;

turn off the aiming pattern after a first predetermined time after the aiming pattern is turned on;

turn on the aiming pattern after a second predetermined time after the aiming pattern is turned off; and, a housing for housing the sensor array, aiming pattern generator and processor for hand held operation, wherein the processor counts the sync signal to determine the predetermined row.

18. A method of reading a target with a hand held device comprising the steps of:

exposing a sensor array to the target, the sensor array having rows of pixels;

turning on an aiming pattern superimposed onto the target during exposure of a predetermined row of pixels;

turning off the aiming pattern after a first predetermined time after the aiming pattern is turned on;

turning on the aiming pattern after a second predetermined time after the aiming pattern is turned off;

storing in memory identification information of the predetermined row;

wherein the processor has memory and further comprising the step of storing identification information of the predetermined row in the memory, wherein the utilizing step comprises counting the sync signal to determine the predetermined row.

* * * * *